United States Patent [19]

Yamaguchi et al.

[11] Patent Number: 4,659,633
[45] Date of Patent: Apr. 21, 1987

[54] MAGNETIC RECORDING MEDIUM

[75] Inventors: Yoshitaka Yamaguchi, Yokohama; Kenji Sumiya, Suita, both of Japan

[73] Assignee: Hitachi Maxell, Ltd., Osaka, Japan

[21] Appl. No.: 838,476

[22] Filed: Mar. 11, 1986

[30] Foreign Application Priority Data

Mar. 16, 1985 [JP] Japan ................................ 60-52735

[51] Int. Cl.$^4$ ................................................ G11B 5/72
[52] U.S. Cl. .................................... 428/695; 360/134; 360/135; 360/136; 427/128; 427/131; 428/421; 428/422; 428/694; 428/900
[58] Field of Search ............... 428/421, 422, 694, 695, 428/900; 427/131, 128; 360/134–136; 252/62.54

[56] References Cited

U.S. PATENT DOCUMENTS

| | | | |
|---|---|---|---|
| 3,784,471 | 1/1974 | Kaiser | 428/900 |
| 4,007,313 | 2/1977 | Higuchi | 252/62.56 |
| 4,327,139 | 4/1982 | Schaefer | 428/695 |
| 4,431,703 | 2/1984 | Somezawa | 428/694 |
| 4,469,751 | 9/1984 | Kobayashi | 428/695 |
| 4,501,801 | 2/1985 | Kimura | 428/694 |
| 4,505,990 | 3/1985 | Dasgupta | 428/694 |

FOREIGN PATENT DOCUMENTS

| | | | |
|---|---|---|---|
| 0092424 | 6/1982 | Japan | 252/62.54 |
| 0131632 | 7/1985 | Japan | 427/131 |
| 0151841 | 8/1985 | Japan | 427/131 |

OTHER PUBLICATIONS

R. S. Abuzayad, "Lubricant for Mag. Recording Disks", IBM Tech. Disclosure Bulletin, vol. 20, No. 11B, Apr. 1978.

Primary Examiner—Ellis P. Robinson
Attorney, Agent, or Firm—Birch, Stewart, Kolasch and Birch

[57] ABSTRACT

A magnetic recording medium having good durability comprising a substrate and one or two magnetic layers at least a surface of which contains at least one compound selected from the group consisting of a compound of the formula:

$$F-(CF_2)_n-COO-(RO)_m-CO-R'-COOH \qquad (I)$$

wherein R is a $C_2$–$C_{10}$ alkyl group, R' is a $C_2$–$C_{10}$ alkyl or alkenyl group, n is an integer of 4 to 20 and m is an integer of 5 to 50 and salts thereof.

9 Claims, No Drawings

MAGNETIC RECORDING MEDIUM

FIELD OF THE INVENTION

The present invention relates to a magnetic recording medium. More particularly, it relates to a magnetic recording medium with good durability.

BACKGROUND OF THE INVENTION

Generally, a magnetic recording medium is produced by painting a magnetic powder composition comprising magnetic powder and a binder on a substrate film surface or by metallizing the surface with a ferromagnetic metal or its alloy to form a magnetic layer. Since the magnetic layer is vigorously slid on a magnetic head during recording and reproducing, the magnetic layer is heavily abraded. Thus, it is highly desired to provide a magnetic layer which is less abraded so that the durability of the magnetic recording medium is prolonged.

To impart good durability to the magnetic recording medium, it was proposed to cover the surface of the magnetic layer with various lubricants. Among the lubricants which may be used, having a perfluoroalkyl group are known to be highly effective. Further, in order to improve the adhesive property of the lubricant to the magnetic layer, it was proposed to use, as a lubricant, a compound having a terminal polar group (e.g. a carboxyl group and its salt form) in addition to a perfluoroalkyl group (cf. Japanese Patent Kokai Publication (unexamined) Nos. 152543/1982 and 200939/1982). It was also proposed to use a perfluoroalkyl carboxylic acid to which $HO(CH_2CH_2O)_nH$ is added as a lubricant to improve both solubility and lubricity (cf. Japanese Patent Kokai Publication (unexamined) No. 45456/1979).

However, the compound having the perfluoroalkyl group and the terminal polar group is dissolved only in a fluorine-containing solvent. Further, since the perfluoroalkyl group is comparatively rigid, the coefficient of friction of the surface is not sufficiently decreased and the abrasion resistance of the magnetic layer is not improved as expected although the surface is fluorinated. The perfluoroalkyl carboxylic acid added with $HO(CH_2CH_2O)_nH$ can overcome the drawbacks of the compound having the perfluoroalkyl group and the terminal polar group and improve the solubility and lubricity. But, since it has a polar alcoholic hydroxyl group, its adhesive property to the magnetic layer is still insufficient so that the improvement in abrasion resistance is not satisfactory.

SUMMARY OF THE INVENTION

One object of the present invention is to provide a magnetic recording medium having improved durability.

Another object of the present invention is to provide a magnetic recording medium having good corrosion resistance.

A further object of the present invention is to provide a magnetic recording medium wherein a surface has a small coefficient of friction.

According to the present invention, there is provided a magnetic recording medium comprising a substrate and one or two magnetic layers at least a surface of which contains at least one compound selected from the group consisting of a compound of the formula:

$$F-(CF_2)_n-COO-(RO)_m-CO-R'-COOH \quad (I)$$

wherein R is a $C_2$-$C_{10}$ alkyl group, R' is a $C_2$-$C_{10}$ alkyl or alkenyl group, n is an integer of 4 to 20 and m is an integer of 5 to 50 and salts thereof. The salt of the compound (I) may be an alkali metal salt (e.g. sodium salt, potassium salt or lithium salt) or an ammonium salt. By the addition of the compound (I) at least in the surface part of the magnetic layer, the durability of the magnetic layer and in turn the magnetic recording medium is improved.

DETAILED DESCRIPTION OF THE INVENTION

Since the compound (I) used according to the present invention has a terminal carboxylic group or its derivative which is hydrophilic, it has good affinity with the magnetic layer so that its adhesive property to the magnetic layer is good. Thus, once it is coated on the surface of the magnetic layer, it firmly adheres to the magnetic layer. In addition, since the compound (I) has a flexible intermediate chain between the perfluoroalkyl group and the carboxylic group, it is easily dissolved in an organic solvent and has better lubricity and water repellency. Of course, the perfluoroalkyl group can impart good lubricity and water and oil repellency to the magnetic layer, the coefficient of friction of the magnetic layer is lowered and the durability as well as corrosion resistance is further improved.

Since the compound (I) can be easily dissolved in an organic solvent which is used in the preparation of the magnetic powder coating, it may be added to a mixture of the magnetic powder, a binder and the solvent. In this case, the compound (I) is contained in the magnetic layer coated on the substrate. Alternatively, a solution of the compound (I) is applied on the magnetic layer by dip coating, spray coating, flow coating and the like. The compound (I) may be vacuum deposited on the surface of the magnetic layer.

The compound (I) may be used alone or as a mixture with at least one other compound (I).

When the compound (I) is contained in the magnetic layer, its amount is usually 0.5 to 20% by weight based on the weight of the magnetic powder contained in the magnetic layer. When the compound (I) is applied on the surface of the magnetic layer, its amount is 1 to 500 $mg/m^2$. If the amount of the compound (I) is too small, the desired effect is not achieved. If the amount is too large, a decrease in output and/or drop out result.

The magnetic layer may be formed on the substrate by a per se conventional method, for example, by coating a mixture of magnetic powder (e.g. $\gamma$-$Fe_2O_3$ powder, $Fe_3O_4$ powder, cobalt-containing $\gamma$-$Fe_2O_3$ powder, cobalt-containing $Fe_3O_4$ powder, iron powder, cobalt powder, iron-nickel powder and the like), the binder, the organic solvent and optionally the compound (I) and drying the coated mixture. Alternatively, the magnetic layer is formed by metallizing, ion plating, sputtering or plating the ferromagnetic material (e.g. cobalt, nickel, iron, cobalt-nickel, cobalt-chromium, cobalt-phosphorous, cobalt-nickel-phosphorous and the like) on the substrate.

The substrate may be any one of the conventionally used substrates, for example, a film of a synthetic resin such as polyester. The magnetic recording medium of the invention includes all conventional medium such as a magnetic tape, a magnetic disc and magnetic drum.

Practical and the presently preferred embodiments of the present invention are shown in the following examples.

EXAMPLE 1

A polyester film having a thickness of 12 μm was subjected to argon gas bombardment and then metallized with a cobalt-nickel alloy in a weight ratio of 9:1 by means of a metallizing apparatus under a reduced pressure of $5 \times 10^{-4}$ Torr. to form a ferromagnetic metallic thin film of the alloy having a thickness of 0.1 μm. Thereafter, on the alloy film, a 2 wt % solution of a compound of the following formula in isopropanol was coated and dried:

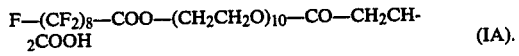

$$F-(CF_2)_8-COO-(CH_2CH_2O)_{10}-CO-CH_2CH_2COOH \quad (IA)$$

The film having the magnetic layer and the protective layer of the compound (IA) was cut into a tape to form a magnetic tape. The amount of the compound (IA) on the magnetic layer was 40 mg/m².

EXAMPLES 2 and 3

A magnetic tape was produced in the same manner as in Example 1, but using the following compound in place of the compound (IA):

(EXAMPLE 2)

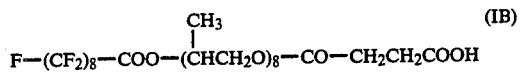

$$F-(CF_2)_8-COO-(CHCH_2O)_8-CO-CH_2CH_2COOH \quad (IB)$$
with CH₃ branch (EXAMPLE 3)

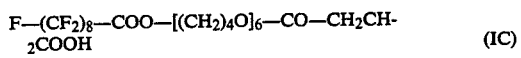

$$F-(CF_2)_8-COO-[(CH_2)_4O]_6-CO-CH_2CH_2COOH \quad (IC)$$

EXAMPLE 4

The following composition was dispersed in a ball mill for 72 hours to prepare a magnetic coating and coated on a polyester film having a thickness of 12 μm and dried to form a magnetic layer having a thickness of 3 μm:

| Composition | Wt. parts |
| --- | --- |
| α-Fe magnetic powder | 600 |
| Vinyl chloride-vinyl acetate copolymer (S-leck CN by Sekisui Chemical Ind.) | 80 |
| Urethane elastomer (Pandex T-5250 by Dainippon Ink Chemical) | 30 |
| Trifunctional low molecular weight isocyanate compound (Colonate L by Nippon Urethane Ind.) | 10 |
| Methyl isobutyl ketone | 400 |
| Toluene | 400 |

On the coated film, the same solution of the compound (IA) as used in Example 1 was coated and dried. The film was cut into a tape. The amount of the compound (IA) on the magnetic layer was 40 mg/m².

EXAMPLES 5 AND 6

A magnetic tape was produced in the same manner as in Example 1, but using the following compound in place of the compound (IA):

(EXAMPLE 5)

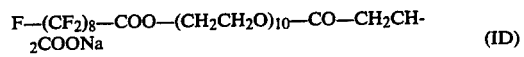

$$F-(CF_2)_8-COO-(CH_2CH_2O)_{10}-CO-CH_2CH_2COONa \quad (ID)$$

(EXAMPLE 3)

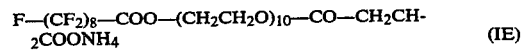

$$F-(CF_2)_8-COO-(CH_2CH_2O)_{10}-CO-CH_2CH_2COONH_4 \quad (IE)$$

COMPARATIVE EXAMPLE 1

A magnetic tape was produced in the same manner as in Example 1, but using a 2 wt % solution of $F(CF_2)_8COOH$ in Freon TF in place of the 2 wt % solution of the compound (IA) in isopropanol. The amount of $F(CF_2)_8COOH$ on the magnetic layer was 35 mg/m².

COMPARATIVE EXAMPLE 2

A magnetic tape was produced in the same manner as in Example 1, but using a 2 wt % solution of $F-(CF_2)_8-CO-(OCH_2CH_2)_{10}-OH$ in isopropanol in place of the 2 wt % solution of the compound (IA) in isopropanol. The amount of $F-(CF_2)_8-CO-(OCH_2CH_2)_{10}-OH$ on the magnetic layer was 35 mg/m².

COMPARATIVE EXAMPLE 3

A magnetic tape was produced in the same manner as in Example 4, but using a 2 wt % solution of $F(CF_2)_8COOH$ in Freon TF in place of the 2 wt % solution of the compound (IA) in isopropanol. The amount of $F(CF_2)_8COOH$ on the magnetic layer was 35 mg/m².

COMPARATIVE EXAMPLE 5

A magnetic tape was produced in the same manner as in Example 4, but using a 2 wt % solution of $F-(CF_2)_8-CO-(OCH_2CH_2)_{10}-OH$ in isopropanol in place of the 2 wt % solution of the compound (IA) in isopropanol. a The amount of $F-(CF_2)_8-CO-(OCH_2CH_2)_{10}-OH$ on the magnetic layer was 35 mg/m².

An initial coefficient of friction, durability and corrosion resistance of each of the magnetic tapes produced in Examples and Comparative Examples were then examined.

Durability is evaluated by installing the magnetic tape in a video tape recording deck (NV-8200 by Matsushita Electric Industrial Co., Ltd.) and counting the number of runs till an S/N ratio decreases by 3 dB. Corrosion resistance is examined by keeping the magnetic tape at 60° C. and relative humidity of 90% for 150 hours and measuring the decreasing rate of magnetization.

The results are shown in following table.

TABLE

| Example No. | Initial coefficient of Friction | Durability (Run No.) | Corrosion resistance |
| --- | --- | --- | --- |
| 1 | 0.19 | 850 | 9.5 |
| 2 | 0.20 | 920 | 4.2 |
| 3 | 0.20 | 905 | 3.6 |
| 4 | 0.18 | 1,050 | 2.1 |
| 5 | 0.20 | 930 | 3.8 |
| 6 | 0.19 | 1,020 | 3.3 |
| Comp. 1 | 0.26 | 350 | 3.5 |
| Comp. 2 | 0.19 | 220 | 13.7 |

TABLE-continued

| Example No. | Initial coefficient of Friction | Durability (Run No.) | Corrosion resistance |
| --- | --- | --- | --- |
| Comp. 3 | 0.25 | 470 | 2.5 |
| Comp. 4 | 0.18 | 430 | 2.6 |

As is seen from the above results, the magnetic tapes of the invention (Examples 1 to 6) have lower coefficients of friction, good corrosion resistance and better durability than the conventional magnetic tapes (Comparative Examples 1 to 4).

What is claimed is:

1. A magnetic recording medium comprising a substrate and one or two magnetic layers at least a surface of which contains at least one compound selected from the group consisting of a compound of the formula:

$$F-(CF_2)_n-COO-(RO)_m-CO-R'-COOH \quad (I)$$

wherein R is a $C_2$-$C_{10}$ alkyl group, R' is a $C_2$-$C_{10}$ alkyl or alkenyl group, n is an integer of 4 to 20 and m is an integer of 5 to 50 and salts thereof.

2. The magnetic recording medium according to claim 1, wherein the compound (I) is a free acid.

3. The magnetic recording medium according to claim 1, wherein the compound (I) is in the form of a salt with an alkali metal.

4. The magnetic recording medium according to claim 1, wherein the compound (I) is in the form of an ammonium salt.

5. The magnetic recording medium according to claim 1, wherein the compound (I) is coated on the surface of the magnetic layer.

6. The magnetic recording medium according to claim 1, wherein the compound (I) contained in the magnetic layer.

7. The magnetic recording medium according to claim 1, which is a magnetic tape.

8. The magnetic recording medium according to claim 1, which is a magnetic disc.

9. The magnetic recording medium according to claim 1, which is a magnetic drum.

* * * * *